Jan. 8, 1963 F. A. OHLINGER ETAL 3,072,023
ROTARY TABLE FOR BORING AND THREADING
Filed April 7, 1960 2 Sheets-Sheet 1

INVENTOR.
FRED A. OHLINGER - AND -
BY FRANK T. SHEPPARD.
Willard S. Grove
ATTORNEY.

Jan. 8, 1963 F. A. OHLINGER ETAL 3,072,023
ROTARY TABLE FOR BORING AND THREADING
Filed April 7, 1960 2 Sheets-Sheet 2
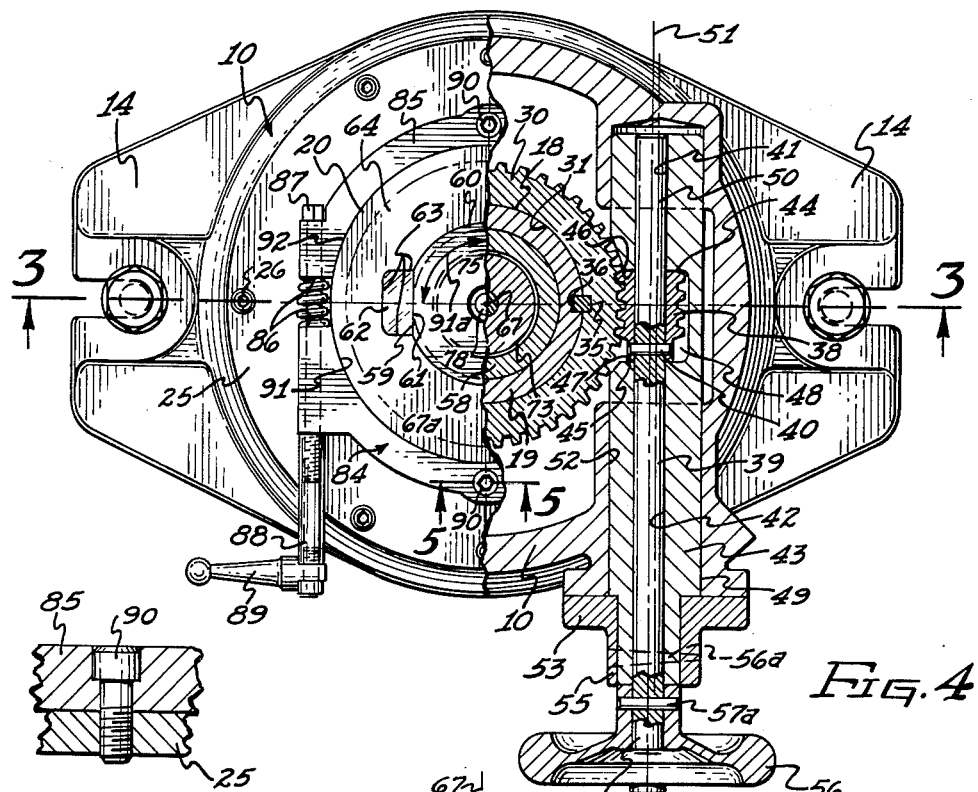
Fig. 4
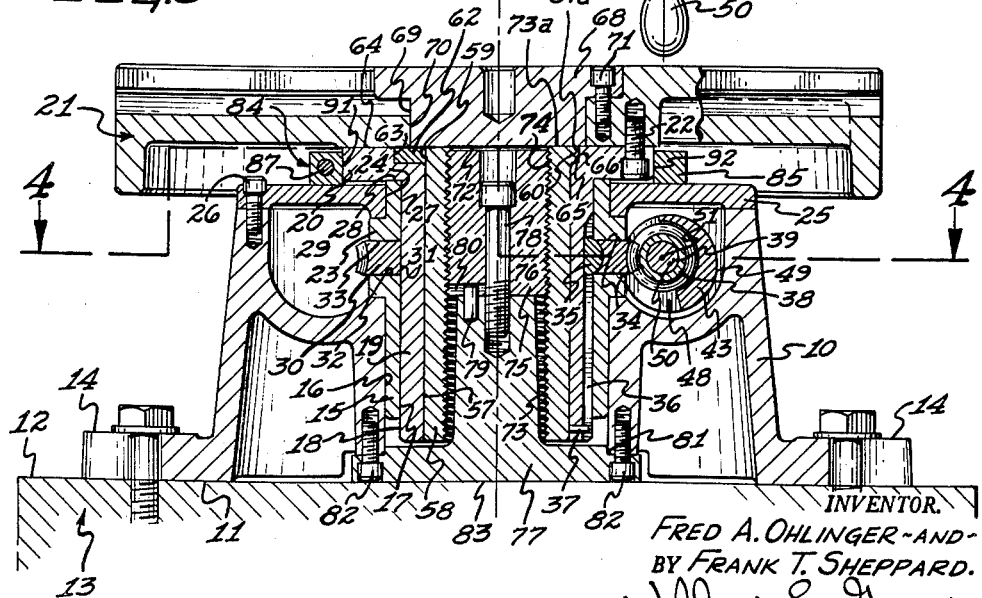
Fig. 5
Fig. 3
INVENTOR.
FRED A. OHLINGER - AND -
BY FRANK T. SHEPPARD.
Willard S. Gwen
ATTORNEY.

United States Patent Office 3,072,023
Patented Jan. 8, 1963

3,072,023
ROTARY TABLE FOR BORING AND THREADING
Fred A. Ohlinger and Frank T. Sheppard, Phoenix, Ariz., assignors to Vernon Tool Company of Arizona, Phoenix, Ariz., a corporation of Arizona
Filed Apr. 7, 1960, Ser. No. 20,745
1 Claim. (Cl. 90—58)

This invention pertains to machine tool apparatus for boring and threading workpieces and is particularly directed to a novel rotary table adapted to facilitate boring and threading operations on a machine tool.

One of the objects of this invention is to provide a rotary table which is usable for its normal circular milling operations and the like but which is also adapted to performing boring and threading operations with equal facility.

Another object of this invention is to provide a rotary table with an arrangement for effecting axis feeding movements of the face plate so that boring operations may be performed on workpieces chucked or clamped to the face plate.

A further object of this invention is to provide a rotary table with means for moving the face plate axially at various precise thread leads so that threads may be milled or otherwise formed in surfaces of workpieces mounted on the face plate.

It is also an object to provide clamping means for rigidly locking the face plate against both rotary and axial movements without distorting the position of said face plate from precise axial alignment.

Further features and advantages of this invention will appear from a detailed description of the drawings in which:

FIG. 3 is an enlarged diametral section on the line 3—3 of FIGS. 1 and 4.

FIG. 4 is an enlarged sectional view on the line 4—4 of FIG. 3.

FIG. 5 is an enlarged fragmentary section on the line 5—5 of FIG. 4.

Figure 1:
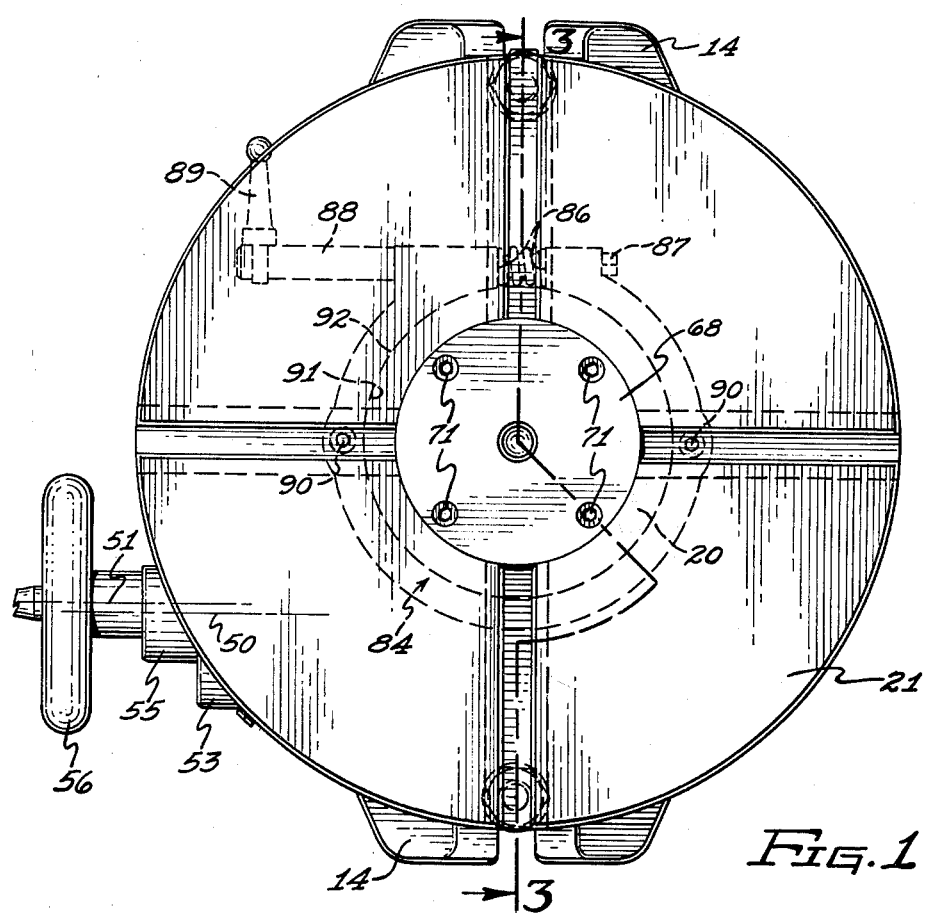
FIG. 1 is a plan view of a rotary table incorporating the features of this invention.
Figure 2:
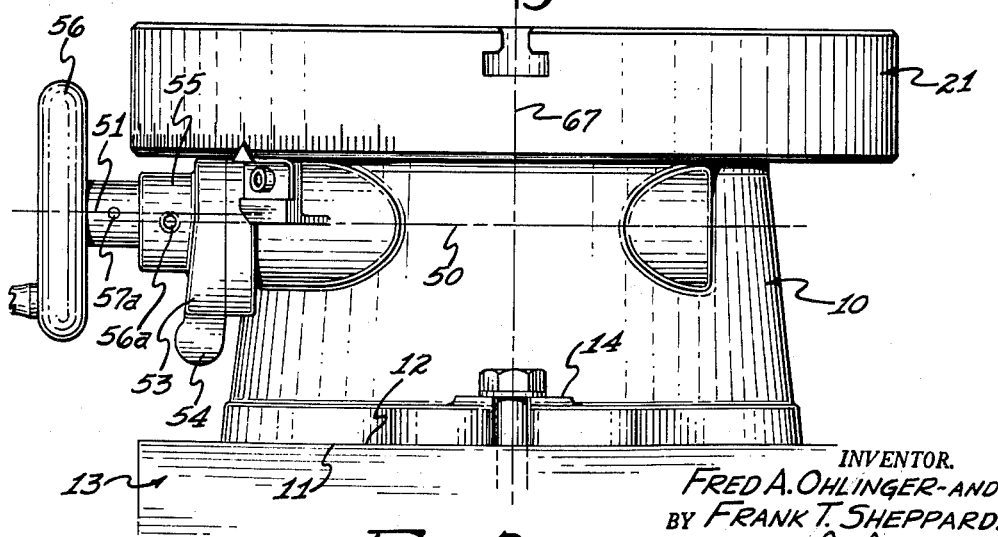
FIG. 2 is a side elevation of the rotary table shown in FIG. 1.

As an example of one embodiment of this invention there is shown a rotary table incorporating the features of this invention, comprising, a base 10 having an accurately machined surface 11 adapted to engage the work table surface 12 of a work table 13 of a machine tool. The base is provided with the usual slotted T-slot bolt clamping lugs 14 for securing the base 10 rigidly to the machine tool table 13.

A main bearing bushing 15 is fixed in the bore 16 of the base 10 and has a bore 17 adapted to journal the diameter bearing portion 18 of the main spindle 19 having the mounting flange 20 to which the face plate 21 is fixed by suitable screws 22. An upper main bearing 23 is fixed in the bore 24 in the top cover plate 25 secured to the base 10 by suitable screws 26. The upper main bearing has a bore 27 adapted to journal the upper portion of the bearing portion 18 of the main spindle 19 and the radially disposed bearing surface 28 engaging the under surface 29 of the flange 20 to take care of the down thrust of the table 21. A worm wheel 30 has a bore 31 slidingly mounted on the bearing portion 18 of the main spindle 19 and is confined against axial movement relative to the base 10 by the abutment surfaces 32 and 33 of the main bearing bushings 15 and 23 which engage the side faces 34 of the worm wheel. A key 35 fixed in the bore 31 of the worm wheel 30 slidingly engages in driving relationship the axially extending keyway 36 formed in the bearing portion 18 of the main spindle 19. A stop pin 37 is fixed in the spindle 19 in the keyway 36 to limit upward travel of the spindle 19 in the bearing bushings 15 and 23.

A driving worm 38 meshing with the worm wheel 30 is fixed on the worm drive shaft 39 by a suitable pin 40, the drive shaft being journaled in the bearing bores 41 and 42 of the eccentric sleeve 43. The worm 38 and drive shaft 39 are confined against axial movement by engagement of the end surfaces 44 and 45 of the worm with the sides 46 and 47 of the worm slot 48 formed in the eccentric sleeve 43. The eccentric sleeve 43 has an outside diameter surface 49 which has its axis 50 offset eccentrically from the axis 51 of the drive shaft, the surface 49 being journaled in the bore 52 formed in the base 10. An actuating lever 53 having a thumb piece 54 and a hub 55 fixed to the sleeve 43 by a suitable pin 56a provides means for rocking the worm to and from engagement with the worm wheel 30. A handwheel 56 is fixed by a suitable pin 57a to the worm drive shaft 39 for the rotation thereof.

Slidably mounted in the bore 57 formed in the spindle 19 is the lead screw nut bushing 58 which has a flat 59 formed on the flange portion 60 thereof which is engaged by the flat surface 61 of a key 62 fixed in the slot 63 formed in the top face 64 of the flange 20 of the spindle 19 so that the bushing 58 cannot rotate relative to the spindle 19. The bushing 58 has a radially disposed abutment surface 65 on its flange 60 which engages the bottom 66 of the counter bore 67a formed in the face 64 of the flange 20 concentric with the axis 67 of rotation of the spindle 19 and of the bore 57. A plug 68 has a diameter portion 69 slidingly fitting in the bore 70 formed in the face plate 21 and held therein by the screws 71. A bottom abutment surface 72 bears against the top surface 73a of the flange 60 to thereby retain the bushing 58 in the spindle 19 in the bore 57.

The bushing 58 has formed in its bore a thread 73 of desired lead which is adapted to engage the mating threaded diameter portion 74 of the lead screw plug member 75 which is clamped to the top surface 76 of the support plug 77 by a suitable demountable clamp screw 78 and held against rotation on the support plug by a pin 79 fixed therein which is adapted to engage in a slot 80 formed in the lead screw plug member 75. The plug 77 has a diameter portion 81 which fits in the bore 16 of the base 10 and is held therein by suitable screws 82. The bottom abutment surface 83 coincides with the surface 11 of the base 10 and in use engages the surface 12 of the machine tool worktable.

A clamp device 84 is provided to lock the spindle 19 against axial and rotary movements relative to the base 10 and comprises a split ring 85 having a slot 86 across which extends the clamp bolt 87 and on the outer end of which is provided the clamping nut 88 having a suitable operating handle 89 fixed thereto. A pair of diametrically disposed screws 90, FIG. 5, threaded into the plate 25 are located at a 90-degree circumferentially spaced position 91a from the slot 86 confine the split clamp ring 85 against axial movement while allowing limited radial movement thereof so that its clamping bore surface 91 may be moved relative to the clamping periphery 92 of the flange 20 of the spindle 19 when the lever 89 is appropriately manipulated.

In the operation: When the clamp 84 is released and the handwheel is rotated to revolve the spindle 19 and the face plate 21, lead screw nut bushing 58 operating on the plug member 75 will cause the face plate to feed axially at a lead determined by the threads 74 selected for the members 57—75, the axial direction and rotation of the face plate movement being determined by the direction of rotation of the hand wheel 56 and whether the threads 74 are right or left hand. When no axial movement is desired in the face plate 21, but only rotary movement as in a conventional rotary table, the members 58 and 75 are removed by taking out screw 78 through the access plug 68 as described. The table may be locked against all movement relative to the base 10 by appropriately manipulating the clamping handle 89. Thus, circular milling, boring and threading operations can readily be performed on work clamped to the work table 21 with this universally adapted rotary table for boring and threading.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claim are intended to be included herein.

Having thus fully set forth and described this invention what is claimed and desired to be obtained by United States Letters Patent is:

A rotary table for rotatably and axially moving a workpiece relative to a cutting tool comprising in combination:
  *a.* a base,
  *b.* a main bearing fixed in said base,
  *c.* a main spindle journaled for both rotary and axial movements in said main bearing,
  *d.* a face plate fixed on said main spindle,
  *e.* a lead screw demountably supported on said base,
  *f.* a lead screw nut bushing demountably supported against rotation on said main spindle and operatively engaging the threads of said lead screw,
  *g.* a plug demountably secured to said face plate adapted to engage said main spindle and said lead screw nut bushing to secure said spindle and lead screw nut bushing against relative axial movement,
  *h.* said plug when removed from said face plate providing access through said face plate for removing said lead screw from said base and said lead screw nut bushing from said main spindle.

References Cited in the file of this patent

UNITED STATES PATENTS

| | | |
|---|---|---|
| 631,770 | Bailey | Aug. 29, 1899 |
| 1,410,442 | Amendt | Mar. 21, 1922 |
| 2,771,169 | Wahlstron | Nov. 20, 1956 |
| 2,783,687 | Roberts | Mar. 5, 1957 |

FOREIGN PATENTS

| | | |
|---|---|---|
| 508,193 | France | Oct. 4, 1920 |

OTHER REFERENCES

Brochure, Advance Cross Slide Rotary Table, received in Division 13, May 1958, Advance Product Corp., Benton Arbor, Mich.